Figure 1:
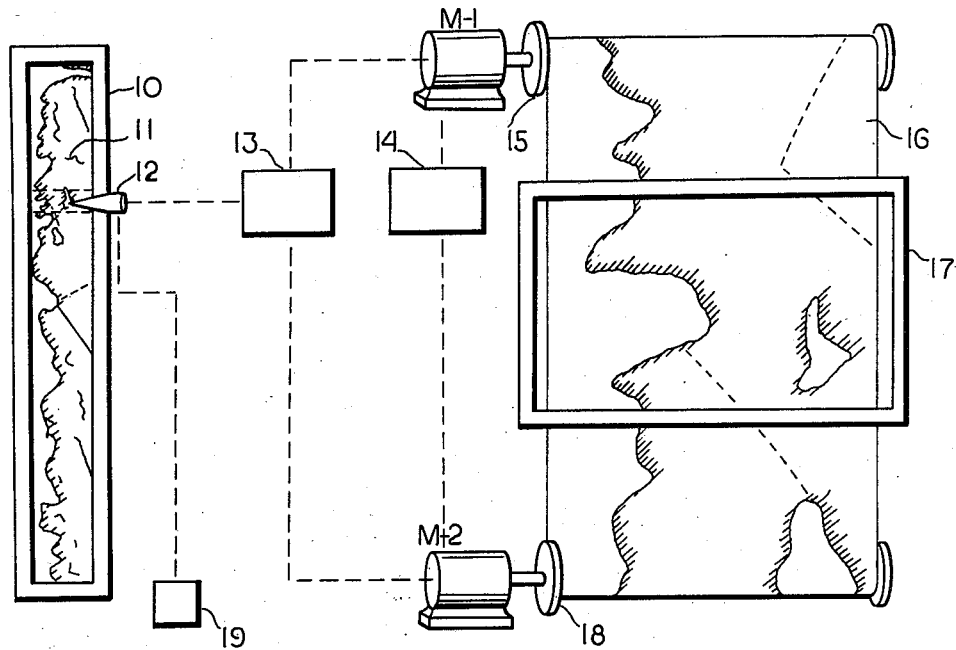

June 23, 1959  F. C. BREUNING  2,891,325

AUTOMATIC MAP LOCATING SYSTEM

Filed June 12, 1957

*INVENTOR.*
FRANK G. BREUNING
BY *Elliott & Pastoriza*
ATTORNEYS

United States Patent Office 2,891,325
Patented June 23, 1959

2,891,325

AUTOMATIC MAP LOCATING SYSTEM

Frank C. Breuning, Los Angeles, Calif.

Application June 12, 1957, Serial No. 665,187

4 Claims. (Cl. 35—40)

This invention relates generally to automatically controlled display maps, and more particularly to an improved map positioning system for facilitating the giving of instructions or general information in briefing conferences and lectures.

A primary object of the invention is to provide a miniature pilot map covering a given territory which may be positioned on a person's desk or a lecturer's platform stand together with a wall map similar to the pilot map but of a scale considerably larger, mounted on a suitable power drive means electrically coupled to the pilot map so that an operator may cause the large wall map to expose certain locations corresponding to locations which he selects on the pilot map, all in a completely automatic manner.

Another important object is to provide a map positioning system of the above type which may be remotely operated by a lecturer should he wish to move away from the speaker's stand or his desk during a demonstration to walk about the lecture room or perhaps up to the larger map to point out certain features therein, the remote controllable means being portable and adapted to be carried about by the lecturer so that the larger map may be automatically positioned by the lecturer from any place within the lecture room.

Still other important objects of this invention are to provide automatic wall map positioning devices which are extremely simple and therefore substantially maintenance free, are rugged and reliable, and employ a minimum number of essential components whereby the entire system may be manufactured economically.

These and many other objects and advantages of the present invention are attained, briefly, by providing a pilot map and indicating device adapted to be moved adjacent the pilot map to designate various locations thereon. There is also provided a wall map similar to the pilot map but having a larger scale of given proportion to the scale of the pilot map. Preferably, this wall map may constitute an enlargement of approximately forty times that of the pilot map. Suitable power means in the form of rollers, for example, serve to support the wall map, a top roller being positioned above the ceiling of the lecture room, and a bottom roller being positioned below the floor of the lecture room so that as the map is rolled from one roller to the other, portions of the map between the rollers are exposed. The width of the map may be twenty feet and the exposed height approximately twelve feet, to fit within a frame covering substantially an entire wall.

Suitable electrical control means are connected between the indicating device on the pilot map and the power means for the rollers so that the wall map supporting rollers are actuated in response to movement of the small indicating device on the pilot map through a suitable servo circuit. The larger map will thus be automatically positioned in accordance with a selected location on the smaller map to display in enlarged form such location.

A remote control device including, for example, a simple selsyn motor may be coupled to the indicating device on the pilot map and controlled by a lecturer who may be walking about the lecture room. By simply carrying the small remote control device in his hand, he may actuate the indicating device of the pilot map to move the enlarged wall map in either direction.

Figure 2:
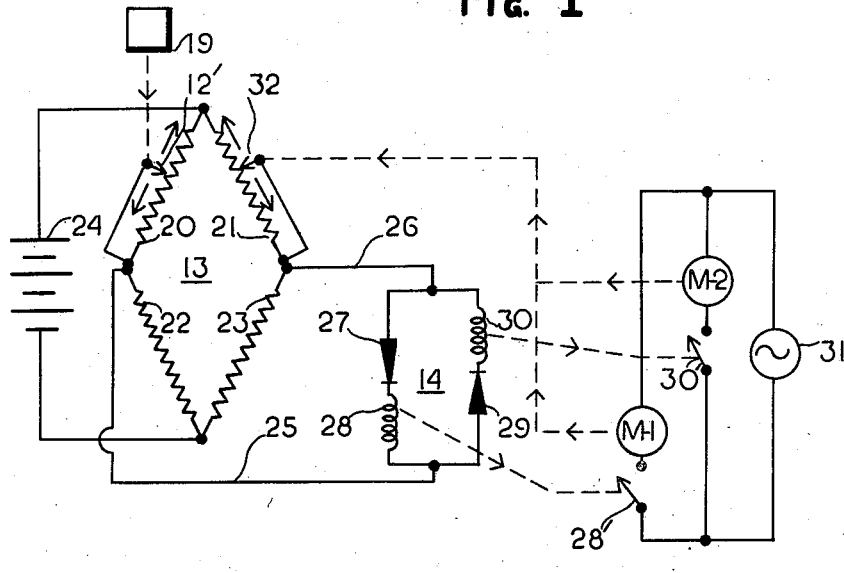

A better understanding of a preferred embodiment of the present invention will be had by referring to the accompanying drawings, in which:

Figure 1 is a highly schematic representation in block diagram form of the entire map positioning system of the present invention; and Figure 2 is an electrical circuit diagram also highly schematic, of the bridge circuit and differential relay portions illustrated in Figure 1 and the manner in which these controls co-operate with the driving means for the wall map.

Referring to Figure 1, there is illustrated a supporting means in the form of a frame 10 for supporting a pilot map 11 covering a given amount of territory. Co-operating with the support means 10 and map 11 is an indicating means in the form of a pointer 12 adapted to be moved longitudinally along the edge of the frame 10 to designate various locations on the pilot map. In a preferred embodiment, the pilot map 11 may be approximately six inches in width and perhaps six feet long.

The pointer 12 serves to actuate a portion of an electrical network comprising a bridge circuit 13 and a differential relay 14. The bridge circuit 13 and differential relay 14 are connected to a pair of drive motors M-1 and M-2. The motor M-1 is drivingly connected to a top roller 15 supporting a wall map 16. Roller 15 is preferably disposed above the ceiling of the lecture room in which the wall map is to be displayed so that only a portion of the wall map 16 is exposed within the lecture room. This portion is defined by the frame 17 which may be approximately twenty feet in width and twelve feet high. The map passes vertically through the frame 17 in the lecture room below the floor level thereof to a lower roller 18 drivingly connected to the motor M-2. The enlarged wall map 16 may be of the order of 240 feet long only twelve feet of length of which are exposed at any one time. As indicated by the dashed lines, the electrical network is such that movement of the indicating pointer 12 to a specific location on the pilot map 11 serves to energize the bridge and differential relay in such a manner as to drive one or the other of the motors M-1 and M-2 to move the map 16 up or down until a corresponding location is positioned within the frame 17. A remote control unit 19 electrically coupled to move the pointer 12 may be provided to enable the operator to move the wall map from a location remote from the pilot map. The manner in which these operations are effected will be better understood by referring now to Figure 2.

In Figure 2, the bridge circuit 13 is shown as comprising a pair of variable resistances 20 and 21 in the upper arms of the bridge and a pair of fixed equal resistances 22 and 23 in the lower arms of the bridge. The variable resistance 20 is varied by means of a tap 12' directly mechanically coupled to the indicating pointer 12 of Figure 1 so that upon movement of the pointer 12 of Figure 1, the slide tap 12' is caused to move along the resistance 20 to change the amount of this resistance within the bridge circuit. Alternatively, this tap 12' may be moved by the remote control unit 19.

The bridge 13 is energized by means of a battery 24 connected across the junction point of the variable resistances 20 and 21 and the junction point of the fixed resistances 22 and 23 so that current from the source 24 is split between the two sides of the bridge in such a manner that when the variable resistance 20 is equal to the variable resistance 21, half of the current from the battery 24 will pass down the variable resistance 20 and fixed resistance 22 and the other half will pass down the variable resistance 21 and fixed resistance 23 back to the negative terminal of the battery. A pair of leads 25 and 26 tap off from the other two bridge junction points defined by the junction point of the variable resistance 20 and the fixed resistance 22 and the junction point of the variable resistance 21 and fixed resistance 23, to pass to the differential relay 14.

The differential relay comprises a parallel circuit consisting of a first rectifier 27 in series with a relay coil 28. Connected in parallel with the rectifier 27 and relay coil 28 is a second rectifier 29 adapted to pass current in the opposite direction from that of the rectifier 27 in series with a second relay coil 30. The arrangement is such that if current is passing through the lead 25 up towards the lead 26, it can only pass through the relay coil 30 inasmuch as the rectifier 27 will block such current from passing through the relay coil 28. On the other hand, if current is passing from the lead 26 down towards the lead 25 it can only pass through the relay coil 28 and is blocked from passing through the relay coil 30 by the rectifier 29.

Relays 28 and 30 are arranged to actuate relay contact switches 28' and 30' respectively to connect a source of electrical energy 31 to either the motor M-1 or M-2 as shown. Both of the motors M-1 and M-2 are mechanically coupled back to a variable tap 32 to vary the value of the second variable resistance 21 in the bridge circuit 13.

The operation of the system will now be described. Assume that the electrical taps 12' and 32 are positioned in corresponding positions as shown on the variable resistances 20 and 21 so that the bridge is balanced and the difference in potential between leads 25 and 26 is zero. In this balanced position, the enlarged scale area corresponding to that between the dashed lines on the pilot map opposite the pointer 12 is positioned within the frame 17 on the wall map 16. If now it is desired to expose another portion of the wall map 16 through the frame 17, the indicating pointer 12 is moved along the pilot map 11 to such point or location. Movement of the indicator pointer 12 longitudinally downwardly, for example, will move the resistance tap 12' downwardly effectively increasing the variable resistance 20 in the bridge circuit 13. This increased resistance will give rise to an increased voltage drop across the variable resistance 20 resulting in a lower potential at the junction of the variable resistance 20 and fixed resistance 22 than appears at the junction of the variable resistance 21 and fixed resistance 23. Therefore, lead 25 will be at a lower potential than lead 26 resulting in current flowing from the lead 26 through the differential relay 14 to lead 25. This current can only pass through the rectifier 27 and relay coil 28 and is blocked from passing through the relay coil 30 by the rectifier 29.

Passage of the current through the relay coil 28 will energize the same to close the switch 28' and energize motor M-1 from the source 31. Operation of the motor M-1 will rotate the top roller 15 to move the map 16 upwardly and thus expose a corresponding lower portion of the map 16 through the frame 17. As the roller 15 is rotated by the motor M-1, the motor M-1 is also coupled back to the bridge circuit to move the tap 32 in a downward direction corresponding to the direction in which the tap 12' was moved. As the tap 32 is moved downwardly, the variable resistance 21 is effectively increased thereby gradually decreasing the potential on line 26 and thus slowly decreasing the potential difference between the lines 25 and 26 and thereby decreasing the current passing through the relay coil 28. When the tap 32 reaches a position on the variable resistance 21 corresponding to the position of the tap 12' on the variable resistance 20, the potential between the lines 25 and 26 will be substantially equal and the bridge will be balanced. When these potentials are equal there will no longer be current flowing through the relay coil 28 and the switch 28' will therefore open removing energy from the motor M-1. The motor M-1 will thus stop and the map 16 will stop moving with the desired location or area to be examined now positioned within the frame 17.

If it is desired to observe an upper portion of the map, movement of the indicating pointer 12 upwardly will cause the tap 12' in the bridge circuit to move upwardly effectively decreasing the variable resistance 20. This decrease in the variable resistance 20 will result in a higher potential on the lead 25 as compared to the potential on the lead 26 thereby causing current to flow through the rectifier 29 and relay coil 30. This current will be blocked from passing through the other arm of the differential relay by the rectifier 27. Energization of the relay coil 30 will close the switch 30' to energize the motor M-2 and rotate the lower roller 18 thereby moving the map downwardly to position a higher portion of the map 16 within the frame 17.

As in the case of the operation of motor M-1, operation of the motor M-2 serves to move the variable tap 32 for the variable resistance 21 in an upward direction to a position corresponding to the new position of the tap 12' on the variable resistance 20. As the tap 32 moves upwardly effectively decreasing the variable resistance 21, the potential on the lead 26 approaches that on the lead 25 and the current across the differential relay decreases until the bridge is balanced, at which time no more current flows through the relay coil 30 and relay contact switch 30' opens to remove energy from the motor M-2. The lower roller 18 is thus stopped and the corresponding new location of map 16 positioned in the frame 17. It will be immediately evident that by employing minimum current relay coils at 28 and 30, any possibility of "hunting" of the system may be avoided by cutting off the motors just prior to proper balancing of the bridge and relying on inertia in the system to bring the tap 32 to a corresponding position as the tap 12'.

It will also be evident that by using the remote control device 19, the map 16 can be moved from any place on the floor. A simple selsyn motor incorporated in the unit 14 and indicating device may serve to move the indicator 12 and thus the variable tap 12'. Movement of the tap 12' by this remote control 19 will then cause the wall map 16 to move in the manner as heretofore described.

It will thus be evident that the present invention provides an extremely simple and reliable circuit for controlling a large wall map by means of a small pilot map. Further, no hunting is involved and the electrical components include a minimum number of precision units whereby an overall economy is achieved in both manufacturing and in operating.

Modifications that fall within the general scope and spirit of this invention will readily occur to those skilled in the art. The particular apparatus disclosed for illustrative purposes is, therefore, not to be thought of as the only embodiment of the present invention.

What is claimed is:

1. An automatic map locating system comprising, in combination: a pilot map; support means for supporting said pilot map; a movable indicating means coupled to said support means and adapted to be moved adjacent said pilot map to designate various locations thereon; a wall map similar to said pilot map having a large scale of given proportion to the scale of said pilot map; power driven means supporting said wall map and adapted to expose portions of said wall map; and electrical control means connected between said indicating means and said power driven means responsive to movement of said indicating means, whereby various locations on said wall map corresponding to said locations on said pilot map may be exposed.

2. A system according to claim 1, including remote control means electrically connected to said movable indicating means, whereby said indicating means may be moved from a remote location.

3. A system according to claim 1, in which said electrical control means includes a bridge circuit having a first variable resistance coupled to said indicating means so that movement of said indicating means changes the value of said first variable resistance to unbalance said bridge and generate a signal; a differential relay means responsive to the polarity of said signal connected to energize said power driven means to move said wall map in a direction determined by said polarity of said signal; and a second variable resistance in said bridge circuit coupled to said power driven means and responsive to movement of said wall map so that movement of said wall map changes the value of said second variable resistance in a manner to rebalance said bridge circuit and terminate said signal.

4. A system according to claim 3, in which said power driven means comprises separated rollers supporting said wall map such that said wall map may be rolled between said rollers to expose different portions of said map between said rollers; separate drive motors connected to rotate said rollers respectively and connected to said differential relay means to be respectively energized in accordance with the polarity of said signal whereby the direction of movement of said wall map is determined by the one of said motors that is energized.

References Cited in the file of this patent

UNITED STATES PATENTS

| | | |
|---|---|---|
| 2,328,055 | Clough | Aug. 31, 1943 |
| 2,387,104 | Wolfers | Oct. 16, 1945 |
| 2,419,802 | Van Horne | Apr. 29, 1947 |
| 2,765,552 | Schlafly | Oct. 9, 1956 |